US005539375A

United States Patent [19]

Atherton

[11] Patent Number: 5,539,375

[45] Date of Patent: Jul. 23, 1996

[54] APPARATUS FOR TRANSMITTING INSTRUMENTATION SIGNALS OVER POWER CONDUCTORS

[75] Inventor: Eric J. Atherton, Oxford, United Kingdom

[73] Assignee: Phoenix Petroleum Services Ltd., Inverurie, United Kingdom

[21] Appl. No.: 204,283

[22] PCT Filed: Sep. 7, 1992

[86] PCT No.: PCT/GB92/01630

§ 371 Date: Mar. 7, 1994

§ 102(e) Date: Mar. 7, 1994

[87] PCT Pub. No.: WO93/05272

PCT Pub. Date: Mar. 18, 1993

[30] Foreign Application Priority Data

| | | | |
|---|---|---|---|
| Sep. 7, 1991 | [GB] | United Kingdom | 9119126 |
| Mar. 25, 1992 | [GB] | United Kingdom | 9206580 |

[51] Int. Cl.[6] .................. H04M 11/04

[52] U.S. Cl. .................. 340/310.01; 340/854.9; 340/855.9; 340/310.2; 307/127

[58] Field of Search .................. 340/310.01, 310.02, 340/854.9, 310.05, 855.3, 855.8, 853.7, 855.9, 853.3; 307/127

[56] References Cited

U.S. PATENT DOCUMENTS

| | | | |
|---|---|---|---|
| 3,284,669 | 11/1966 | Boyd | 340/854.9 |
| 3,340,500 | 9/1967 | Boyd et al. | 340/853.7 |
| 3,764,880 | 10/1973 | Rose | 363/22 |
| 4,157,535 | 6/1979 | Balkanli | 340/855.9 |
| 4,178,579 | 12/1979 | McGibbeny et al. | 340/853.3 |
| 4,523,194 | 6/1985 | Hyde | 340/855.9 |
| 4,581,613 | 4/1986 | Ward et al. | 340/855.9 |
| 4,620,189 | 10/1986 | Farque | 340/853.3 |
| 4,631,535 | 12/1986 | Butlin | 340/855.9 |
| 4,631,536 | 12/1986 | Ward et al. | 340/855.9 |
| 4,901,070 | 2/1990 | Vanderier | 340/855.9 |

FOREIGN PATENT DOCUMENTS

| | | |
|---|---|---|
| 0097479 | 1/1984 | European Pat. Off. . |
| 0112115 | 6/1984 | European Pat. Off. . |
| 2367272 | 5/1978 | France . |
| 1589546 | 5/1981 | United Kingdom . |

OTHER PUBLICATIONS

Gray, I & CS—Industrial and Process Control Magazine, vol. 61, No. 3, Mar. 1988, pp. 49–52.

*Primary Examiner*—John K. Peng
*Assistant Examiner*—Benjamin C. Lee
*Attorney, Agent, or Firm*—Florence U. Reynolds

[57] ABSTRACT

A downhole instrumentation system comprises one or more transducers coupled in a DC current circuit between the star point of an electrical submersible pump and the chassis. A sensing circuit including a DC power supply and an ammeter is arranged to monitor the current drawn. The system includes active electronic components which provide a sequence of signals that may include reference and measuring signals or multiplexed signals from the transducers.

15 Claims, 2 Drawing Sheets

APPARATUS FOR TRANSMITTING INSTRUMENTATION SIGNALS OVER POWER CONDUCTORS

BACKGROUND OF THE INVENTION

This invention relates to a remote instrumentation system, for use with equipment providing a three phase power supply to a motor, comprising signalling means, including a transducer, for connection between a neutral point of the motor winding circuit and the motor chassis, and sensing means for connection to the three phase power supply circuit at a point remote from said motor, said sensing means being arranged to provide a DC signal to said signalling means via said motor winding circuit and to detect a transducer measurement by monitoring the DC signal passed by said signalling means.

In the field of remote instrumentation it is often desirable to provide power to the remote instrumentation through an electrical conductor and to receive and transmit signals over the same conductor.

Such a situation arises in the oil industry, for example, where instrumentation at the bottom of an oil well is powered by, and communicates with, surface equipment. To minimize the cost of the interconnecting cable, the remote instrumentation is often powered by a DC signal on a single conductor cable and the signal is returned as an AC frequency, or pulse train, on the same conductor.

In some installations, an electrical submersible pump is positioned at the bottom of the oil well which is powered from the surface by AC current, typically at the normal mains frequency of 50 or 60 Hertz. In these cases it is most convenient to transmit any instrumentation signals from the locality of the pump to the surface via the power cable or cables, rather than by installing a separate cable for these signals.

It is known that high frequency signals can be imposed on the power lines. These frequencies can later be separated out from the mains frequency using filters to recover the signal information at the surface. However, these high frequency signals cannot pass through the motor windings of the submersible pump, and so a cable splice into the power cable above the pump is required. This is highly undesirable, as this splice (or junction) is a cause of unreliability in the aggressive environment found at the bottom of an oil well. In addition, any failure in the instrumentation can potentially cause a low impedance path for the electrical pump power, and so prevent the pump from operating.

It is also known that a variable resistance transducer (often referred to as a potentiometric transducer) may be used to communicate pressure or temperature information over the power cables of a submersible pump. Submersible pumps generally employ three-phase motors, and at the bottom of such a motor, the three phases are connected to form a "star" or neutral point. The potentiometric transducer may be connected between this star point and the motor chassis.

The surface equipment may measure the resistance of this transducer via the power cable and motor windings. The advantage of this well known system is that no high-voltage cable splices are required, and in addition, any failure of the transducer system will not prevent continued motor operation, as the star point may be shorted to chassis, or left open, with no adverse effect on motor operation. One disadvantage of this system arises from the resistance of the power cable conductors that are electrically in series with the potentiometric transducer. Any change in this power cable resistance will affect the ultimate reading. Furthermore, this technique requires the use of potentiometric transducers which are unreliable and inaccurate.

The first disadvantage may be reduced to a certain extent by using diodes to steer the measuring current through the transducer when powered from the surface using one electrical polarity, and to short out the transducer when powered using the converse polarity. In this way, the first polarity provides the sum of transducer and cable resistance, and the second polarity provides just the cable resistance. Hence the true transducer resistance may be calculated. However, the other above-mentioned disadvantages remain; and furthermore, no more than one transducer may be used in this system — or two, if the cable resistance correction feature is not used.

It is an object of the invention to overcome, or at least reduce, at least one of the above-mentioned disadvantages.

SUMMARY OF THE INVENTION

According to the present invention, a system as initially referred to is characterized in that said signalling means comprises an active electronic circuit arranged to modulate the current drawn in response to the application of said DC signal, whereby the transducer measurement can be detected as a function of the signal current. Preferably said active electronic circuit is arranged to provide a sequence of signals, and that said sensing means is arranged to respond to said sequence of signals.

The active electronic circuit may provide transducer excitation and signal conditioning for a variety of transducers, including strain gauge and capacitive types. The signalling means returns signal information to the sensing means by modulating a substantially DC signal that may pass through the windings of the motor, which may, in the case of a downhole instrumentation system for an oil well, be the motor of an electric submersible pump. Such downhole instrumentation may modulate its own current consumption as a means of signalling to the surface. Such current modulation eliminates errors due to cable resistance, and provides good noise immunity. In such a transmission system, the surface system typically provides a substantially constant voltage, and the downhole instrumentation system sinks a precise amount of current depending on the transducer signal. Typically an offset is applied to the transducer signal, so that a zero signal from the transducer allows a specific amount of current to flow, so that current is always available for the active electronics. The DC current may be sensed by the surface system, and translated into the transducer reading.

Active electronics in the instrumentation system allow for signal conditioning of a variety of transducers, in particular strain gauge transducers may be used which are generally of superior accuracy and resolution to potentiometric transducers. A high voltage diode may be placed in series with the instrumentation system, so that the cable insulation resistance may be measured at any time with a conventional high voltage resistance meter, this resistance meter being operated so that the electrical polarity generated by the meter acts to reverse bias the high voltage diode. It should be noted that when downhole measurements are being made, the surface system provides a voltage of the correct polarity to forward bias this high voltage diode. It should be further noted that although there will be a voltage drop across the high voltage diode, this will in no way affect the accuracy of the measurement if current signalling is used, as the signal is transmitted in terms of current, not voltage.

A further aspect of this invention is the use of the active downhole electronics to time multiplex the signal to the surface allowing the use of multiple transducers. The downhole instrumentation may contain several transducers, with the signal from each transducer being sequentially transmitted to the surface for a fixed period of time. Typically each series of transmissions is preceded with a "zero" and "full-scale" signal. This enables the surface system to identify the start of a sequence, and also allows both zero offset and span calibrations to be applied. It will be appreciated that the time multiplexing technique may be used in conjunction with the DC current signalling method already disclosed, or it may be used with other signalling methods, such as using voltage signals, or variable resistance. It will be appreciated that the time multiplexing technique may be used to send signals sequentially from a wide variety of transducers, including pressure, temperature, and vibration sensors. The rotational speed of the downhole pump may also be transmitted.

BRIEF DESCRIPTION OF THE DRAWINGS

The invention is illustrated by way of example in the accompanying drawings, in which.

DETAILED DESCRIPTION

Figure 1:
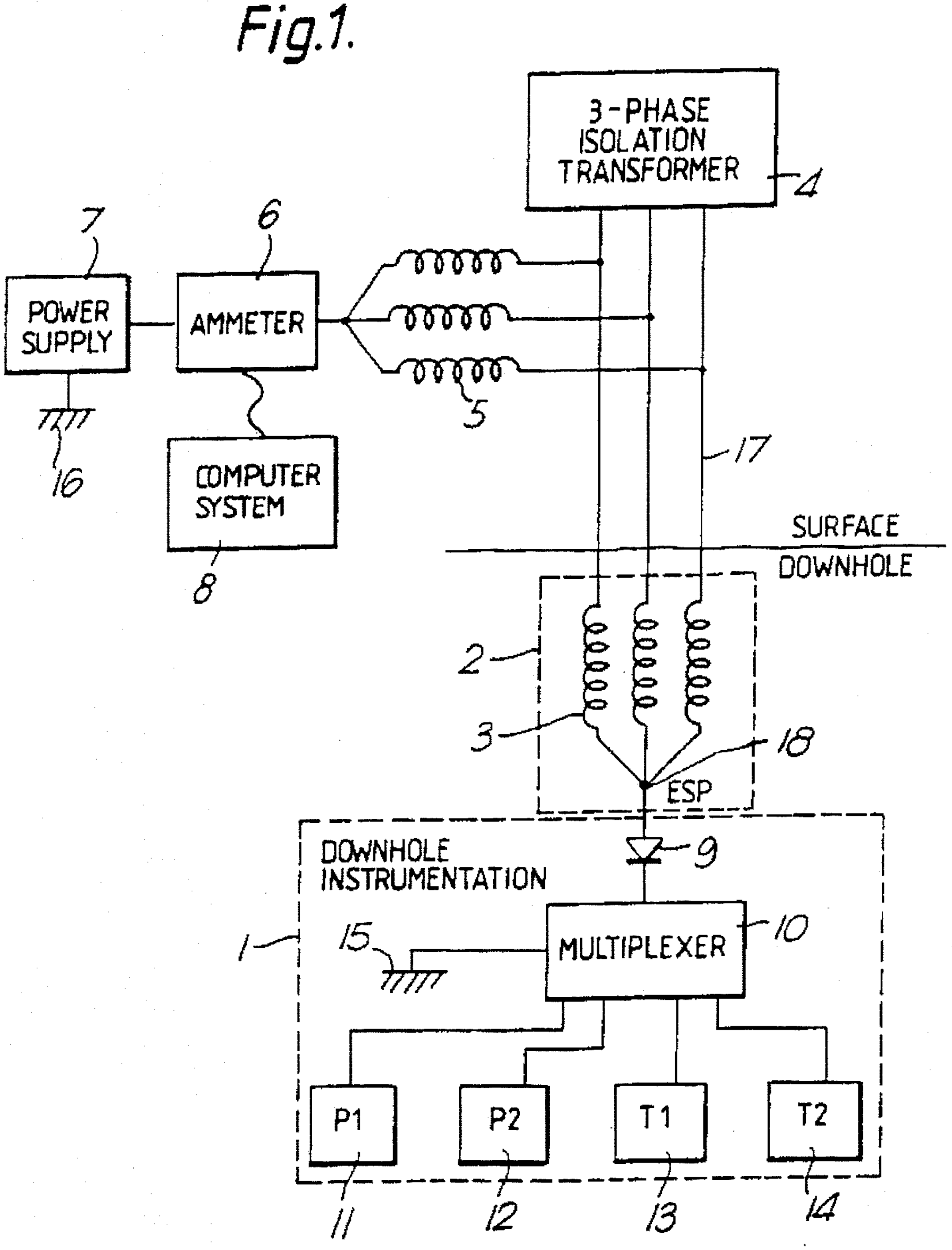
FIG. 1 is a block circuit diagram of one embodiment of instrumentation system according to the invention; and, FIG. 2 is a more detailed circuit diagram corresponding to part of FIG. 1.

FIG. 1 shows an electrical submersible pump 2, containing three motor coils 3, each coil being driven by alternating current via each of three power cables 17, from three-phase transformer 4. The lower connections of each of the coils 3 are brought together to form the star point 18. A wire from star point 18 connects to the downhole instrumentation 1, consisting of high voltage diode 9, multiplexer 10, and transducers 11, 12, 13, 14. At the surface, high voltage chokes 5 connect to the power cables 17. The low voltage side of the chokes 5 are connected together and routed to ammeter 6. A power supply 7 supplies a constant positive voltage with respect to chassis 16 to the chokes 5 via the ammeter 6. A computer 8 reads the current flowing through the ammeter 6. Multiplexer 10 has six logical states and remains in each logical stage for a fixed period of, typically, five seconds before progressing to the next state. After the last state the multiplexer 10 resets to the first state to repeat the cycle. During the first state the multiplexer sinks a current of precisely 10 mA to chassis 15. During the second state, the multiplexer 10 sinks a current of precisely 110 mA. During the third state, the multiplexer sinks a current depending on the signal from transducer 11. During the fourth, fifth and sixth states the multiplexer sinks currents depending on the signals from transducers 12, 13, 14, respectively. For each transducer, 0.00% of full scale reading corresponds to a current of 10 mA, and 100.00% of full scale reading corresponds to a current of 110 mA. For example, transducer 11 is a 10,000 psi transducer, and when 5,000 psi is applied to transducer 11, the multiplexer sinks 60 mA during the third state.

The computer system 8 contains a program to monitor the ammeter 6. It also contains calibration data for the transducers 11, 12, 13, 14. The computer system 8 synchronises with the downhole multiplexer by detecting the transition from approximately 10 mA to 110 mA between the first and second states. In this way it can correctly read the current from ammeter 6 for each of the six states. The extent to which the current during the first state deviates from 10 mA indicates a shift in the zero offset of the entire measurement system. This could be caused by electrical drift in the downhole instrumentation or current leakages from the cable. Similarly the deviation of the current during the second state from 110 mA indicates a measurement system span shift. These zero and span shifts are then used to correct the transducer current signals and to calculate the reading of the transducers. For example, if the current during the first state is denoted as IZ, the current during the second state as IS, and the current during the third state as IT, and transducer 11 is a 10,000 psi transducer, the actual reading of transducer 11 is calculated from:

$$\textit{Transducer } \mathbf{11} \textit{ reading(psi)} = 10{,}000 \times (IT - IZ)/(IS - IZ)$$

Similarly the actual readings from transducers 12, 13, 14 may be calculated. Transducer 13 monitors the internal temperature of the electric submersible pump 2, while transducer 14 monitors the external temperature of the well fluids. The difference between these two temperature readings is used to indicate excessive temperature rise within the submersible pump 2 and hence warn of impending failure. The readings of pressure transducer 11 are corrected for temperature drift using the readings of temperature transducer 13. The computer system 8 stores incoming data for later analysis and retrieval.

During operation of the measurement system the current during state 1 serves as a crude indication of any cable leakage. Additionally, at any time, the ammeter 6 and power supply 7 may be disconnected, and a high voltage resistance meter (commonly called a "Megga") may be used to check cable resistance. The resistance meter is connected so as to generate a negative voltage with respect to chassis 16. In this way high voltage diode 9 is reverse biased and exhibits a very high resistance that does not affect the resistance reading.

Figure 2:
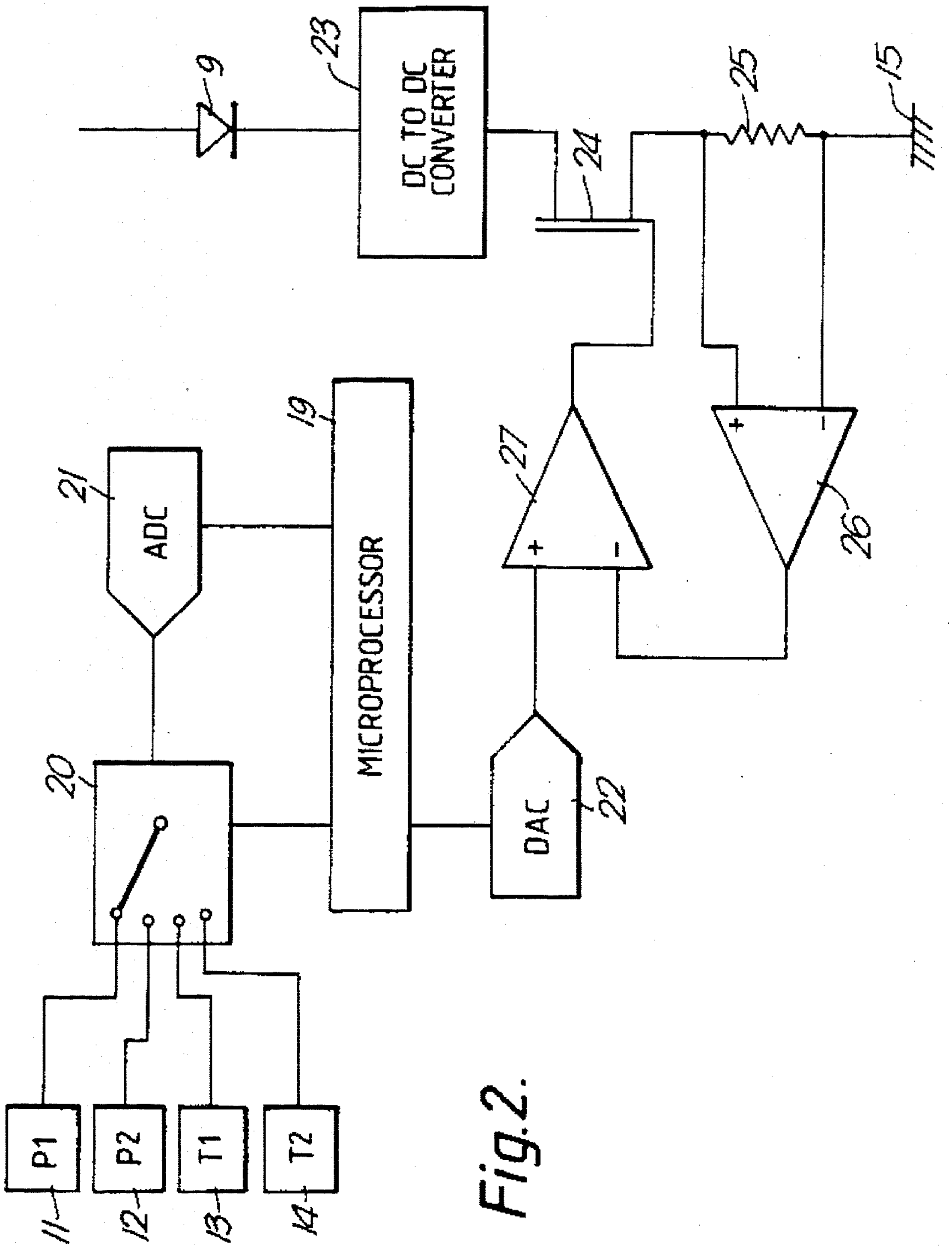

FIG. 2 shows the circuitry of the multiplexer 10 in more detail.

The signals from transducers 11, 12, 13, 14 are routed to analogue switch 20, which is under the control of the microprocessor 19. The output of switch 20 is routed to analogue to digital converter (ADC) 21 which converts the currently selected transducer signal to a digital value, which may be read by the microprocessor 19.

Microprocessor 19 performs a pre-programmed sequence, outputting digital values to digital to analogue converter (DAC) 22. The analogue voltage from DAC 22 is routed to op-amp 27 which controls the n-channel mosfet 24.

Current flowing through high voltage diode 9 flows through DC to DC converter 23, mosfet 24 and resistor 25. The DC to DC converter 23 supplies electrical power to all electronic components and transducers.

The voltage developed across resistor 25 is amplified by instrumentation amplifier 26. This voltage is proportional to the current flowing through the resistor. This current is identical to the current flowing through the high voltage diode 9, as the DC to DC converter 23 has an isolation barrier, and negligible current flows in the gate of mosfet 24 and in the input terminals of instrumentation amplifier 26.

Instrumentation amplifier 26, operational amplifier 27 and mosfet 24 form a negative feedback loop that ensures that the current flowing in resistor 25 is proportional to the output voltage of DAC 22. In this way, microprocessor 19 may set the current consumption of the entire downhole instrumentation by setting the DAC 22 to appropriate values.

I claim:

1. A remote instrumentation system for use with equipment providing a three phase power supply by a three phase power supply circuit to a motor having a motor winding circuit and a motor chassis comprising signalling means including a transducer, for connection between a neutral point of the motor winding circuit and the motor chassis, and sensing means for connection to the three phase power supply circuit at a point remote from said motor, said sensing means being arranged to provide a DC signal to said signalling means via said motor winding circuit and to detect a transducer measurement by monitoring a DC signal returned from said signalling means via said motor winding circuit, wherein said signalling means comprises an active electronic circuit arranged to modulate the current drawn by said signalling means according to the transducer measurement in response to the application of said DC signal to said signalling means to produce the return DC signal whereby the transducer measurement is detected as a function of the current returned from said signalling means, and wherein said signalling means comprises a current sink circuit including, in series, a load resistance and an active circuit element for controlling the current drawn by said resistance, and a signalling circuit including said transducer and a microprocessor having an input coupled to said transducer and an output coupled to said active circuit element by way of a feedback control circuit including a current sensor coupled in parallel with said load resistance.

2. A system according to claim 1, wherein said current sink circuit further includes a DC to DC converter having an isolation barrier and arranged to permit power to be applied to said signalling circuit.

3. A remote instrumentation system for use with equipment providing a three phase power supply by a three phase power supply circuit to a motor having a motor winding circuit and a motor chassis comprising signalling means including a transducer, for connection between a neutral point of the motor winding circuit and the motor chassis, and sensing means for connection to the three phase power supply circuit at a point remote from said motor, said sensing means being arranged to provide a DC signal to said signalling means via said motor winding circuit and to detect a transducer measurement by monitoring a DC signal returned from said signalling means via said motor winding circuit, wherein said signalling means comprises an active electronic circuit arranged to modulate the current drawn by said signalling means according to the transducer measurement in response to the application of said DC signal to said signalling means to produce the return DC signal whereby the transducer measurement is detected as a function of the current returned from said signalling means, and wherein said signalling means is connected in series with a diode, and that said sensing means is arranged to apply a DC voltage of a first polarity for providing said DC signal to said signalling means and to provide a DC voltage of a second polarity to reverse bias said diode, for measurement of the resistance of said three phase power supply circuit.

4. A system according to claim 3, being a downhole system for an oil well, wherein said motor comprises the motor of an electric submersible pump.

5. A system according to claim 3, wherein said active electronic circuit is arranged to provide a sequence of signals through said modulation, and that said sensing means is arranged to respond to said sequence of signals.

6. A system according to claim 5, wherein said signalling means includes a multiplexer arranged to provide a sequence of measurement signals from a plurality of transducers.

7. A system according to claim 5, wherein said sensing means comprises a current measuring device connected in series with a DC power supply for supplying said DC signal to said signalling means, and a computer system arranged to receive data input from said current measuring device and programed to respond to a sequence of signals detected thereby.

8. A remote instrumentation system, for use with equipment providing a three phase power supply by a three phase power supply circuit to a motor having a motor winding circuit and a motor chassis, comprising signalling means, including a transducer, for connection between a neutral point of the motor winding circuit and the motor chassis, and sensing means for connection to the three phase power supply circuit at a point remote from said motor, said sensing means being arranged to provide a DC signal to said signalling means via said motor winding circuit and to detect a transducer measurement by monitoring a DC signal returned from said signalling means via said motor winding circuit, wherein said signalling means comprises an active electronic circuit arranged to modulate the current drawn by said signalling means according to the transducer measurement in response to the application of said DC signal to said signalling means to produce the return DC signal whereby the transducer measurement is detected as a function of the current returned from said signalling means, wherein said active electronic circuit is arranged to provide a sequence of signals through said modulation, said sensing means is arranged to respond to said sequence of signals and wherein said signalling means is arranged to provide through said modulation, in sequence, at least one reference signal wherein said DC signal applied to said signalling means is maintained at a predetermined reference value, and at least one measurement signal wherein said DC signal applied to said signalling means is modulated and maintained at a value determined by the value of a parameter detected by said transducer, and said sensing means is arranged to compute the said value of said parameter from the relative values of said reference and measurement signals.

9. A system according to claim 8, wherein said signalling means comprises a current sink circuit including, in series, a load resistance and an active circuit element of said active electronic circuit for controlling the current drawn by said resistance, and a signalling circuit including said transducer and a microprocessor having an input coupled to said transducer and an output coupled to said active circuit element by way of a feedback control circuit including a current sensor coupled in parallel with said load resistance.

10. A system according to claim 8, wherein said sensing means comprises a current measuring device connected in series with a DC power supply, and a computer system arranged to receive data input from said current measuring device and programed to respond to a sequence of signals detected thereby.

11. A system according to claim 8, wherein said signalling means is connected in series with a diode, and that said sensing means is arranged to apply a DC voltage of a first polarity for providing said DC signal to said signalling means and to provide a DC voltage of a second polarity to reverse bias said diode, for measurement of the resistance of the three phase power supply circuit.

12. A system according to claim 8, wherein said signalling means is arranged to provide two of said reference signals representing limit values of a range of possible measurement signals.

13. A system according to claim 12, characterized in that said signalling means includes a multiplexer arranged to provide a sequence of measurement signals from a plurality of transducers.

14. A system according to claim 8, wherein said signalling means includes a multiplexer arranged to provide a sequence of measurement signals from a plurality of transducers.

15. A system according to claim 14 wherein said multiplexer is coupled between a plurality of transducers and said input of said microprocessor, and said microprocessor has a further output coupled to a control input of said multiplexer.

* * * * *